United States Patent
Potter et al.

(10) Patent No.: US 9,985,266 B1
(45) Date of Patent: May 29, 2018

(54) BATTERY CONNECTION DEVICES

(71) Applicant: Google Inc., Mountain View, CA (US)

(72) Inventors: Steven Dickinson Potter, Bedford, MA (US); Brian Todd Dellon, West Roxbury, MA (US)

(73) Assignee: Boston Dynamics, Inc., Waltham, MA (US)

( * ) Notice: Subject to any disclaimer, the term of this patent is extended or adjusted under 35 U.S.C. 154(b) by 71 days.

(21) Appl. No.: 15/141,711

(22) Filed: Apr. 28, 2016

(51) Int. Cl.
*H01M 2/02* (2006.01)
*H01M 2/20* (2006.01)
*H01M 2/22* (2006.01)
*H01M 2/10* (2006.01)

(52) U.S. Cl.
CPC ......... *H01M 2/206* (2013.01); *H01M 2/1022* (2013.01); *H01M 2/1077* (2013.01); *H01M 2/204* (2013.01); *H01M 2/22* (2013.01)

(58) Field of Classification Search
CPC .... H01M 2/1022; H01M 2/1077; H01M 2/20; H01M 2/202; H01M 2/204; H01M 2/206; H01M 2/208; H01M 2/22; H01M 2/24; H01M 2/26
See application file for complete search history.

(56) References Cited

U.S. PATENT DOCUMENTS

| | | | |
|---|---|---|---|
| 4,952,271 A | 8/1990 | Cheung et al. | |
| 5,607,793 A | 3/1997 | Alexandres et al. | |
| 2007/0099073 A1 | 5/2007 | White et al. | |
| 2014/0154924 A1 | 6/2014 | Huang et al. | |
| 2014/0212695 A1 | 7/2014 | Lane et al. | |
| 2015/0140393 A1* | 5/2015 | Yamamoto | H01M 2/1077 429/121 |

* cited by examiner

*Primary Examiner* — Anca Eoff
(74) *Attorney, Agent, or Firm* — Honigman Miller Schwartz and Cohn LLP

(57) ABSTRACT

Example energy-storage implementations are provided. One example implementation involves a device that has a gap extending between a first side of the device and a second side opposite to the first side. The first side is to overlap a first cell and a second cell. The device includes a first contact to couple with the first cell and a second contact to couple with the second cell. The device also includes a flexure having a curved edge adjacent to the gap. The curved edge extends from a first end positioned to overlap with the first cell to a second end positioned to overlap with the second cell. A curvature of the curved edge flexibly changes in response to a motion of the first contact.

17 Claims, 9 Drawing Sheets

BATTERY CONNECTION DEVICES

BACKGROUND

Improvements in technology have caused many electronic systems to operate more effectively. One contributing factor to the effectiveness of electronic systems is their corresponding power supply technology. In particular, improvements in power supply technology can improve the effectiveness of electronic systems. Batteries are one type of power supply used by many electronic systems. Thus, improvements in battery technology can enable many electronic systems to operate more effectively.

SUMMARY

Example implementations are provided including an example power supply device that houses one or more cell banks. Each cell bank contains multiple battery cells arranged according to a physical arrangement. The physical arrangement of the battery cells aligns the battery cells for welding to weld straps to generate a combined power output of the battery cells. A weld strap may include a flexure to provide an axis of motion of a battery cell relative to another battery cell or to the cell bank.

In one example, a device is provided that comprises a plurality of energy-storage cells including a first cell and a second cell. The device also comprises a conductive sheet that has a gap extending between a first side of the conductive sheet and a second side of the conductive sheet opposite to the first side. The first side is positioned adjacent to a first terminal of the first cell and a second terminal of the second cell. The conductive sheet comprises a first contact positioned to overlap the first terminal and to electrically couple the first terminal with the conductive sheet. The conductive sheet also comprises a second contact positioned to overlap the second terminal and to electrically couple the second terminal with the conductive sheet. The conductive sheet also comprises a flexure that includes a portion of the conductive sheet adjacent to the gap. The flexure has a curved edge adjacent to the gap. The curved edge extends from a first end positioned to overlap with the first cell to a second end positioned to overlap with the second cell. A curvature of the curved edge flexibly changes in response to a motion of the first contact relative to the second contact.

In another example, a weld strap device is provided. The weld strap device has a gap extending between a first side of the device and a second side of the device opposite to the first side. The first side is configured to overlap a first energy-storage cell and a second energy-storage cell. The device comprises a first contact to overlap with the first cell and to electrically couple the first cell with the device. The device also comprises a second contact to overlap with the second cell and to electrically couple the second cell with the device. The device also comprises a flexure having a curved edge between the gap and the flexure. The curved edge extends from a first end positioned to overlap with the first cell to a second end positioned to overlap with the second cell. A curvature of the curved edge flexibly changes in response to a motion of the first contact.

In yet another example, a device is provided that comprises a plurality of energy-storage cells including a first cell and a second cell. The device also comprises a frame to receive the plurality of cells in a particular physical arrangement. The device also comprises a conductive sheet having a plurality of gaps extending from a first side of the conductive sheet to a second side of the conductive sheet opposite to the first side. The first side is positioned adjacent to the first cell and the second cell. The conductive sheet comprises a first contact positioned in accordance with the particular physical arrangement to overlap with the first cell and to electrically couple the first cell with the conductive sheet. The conductive sheet also comprises a second contact positioned in accordance with the particular physical arrangement to overlap with the second cell and to electrically couple the second cell with the conductive sheet. The conductive sheet also comprises a plurality of flexures that correspond to a portion of the conductive sheet adjacent to at least one gap of the plurality of gaps. The plurality of flexures have respective curved edges separating the plurality of flexures from the at least one gap. The respective curved edges extend from first respective ends positioned to overlap with the first cell to second respective ends positioned to overlap with the second cell. A curvature of at least one of the respective curved edges flexibly changes in response to a motion of the first contact relative to the second contact.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed implementations with reference to the accompanying figures. The illustrative implementations described herein are not meant to be limiting. It may be readily understood that certain aspects of the disclosed implementations can be arranged and combined in a wide variety of different configurations.

Within examples, an energy-storage device, such as a battery, may include a plurality of energy-storage cells arranged in a physical arrangement. Two or more terminals of the plurality of cells may be electrically coupled to one another via a conductive sheet, such as a weld strap, to combine power output of two or more of the plurality of cells. The two or more terminals may be connected to the conductive sheet via contacts in the conductive sheet. A contact, for example, may correspond to a portion of the conductive sheet welded to a respective terminal.

In some instances, various forces applied on the battery pack may cause a contact to become disconnected from an associated cell and/or the conductive sheet. In one instance, the energy-storage device may experience vibrations, shocks, or other forces that cause a particular cell to move relative the conductive sheet and/or relative to other cells connected to the conductive sheet. In another instance, the conductive sheet may apply a force on the weld joint due to motion of another cell that is also connected to the conductive sheet, motion of another component of the energy-storage device coupled to the conductive sheet, or any other force that is applied to the conductive sheet.

Example implementations herein include devices that allow a contact associated with a cell terminal (e.g., where the conductive sheet is welded to the terminal, etc.) to move along at least one axis of motion relative to the conductive sheet. The at least one axis of motion may be defined by flexures positioned, for example, between two or more cells. In some implementations, the flexures correspond to a portion of the device having a curved edge adjacent to a gap in the conductive sheet. In these implementations, the flexure can flexibly bend such that the curvature of the curved edge changes to stretch or compress the flexure. Thus, an example implementation may reduce the likelihood of a failure of an electrical interface (e.g., due to damage/dislocation of weld contact, etc.) between a cell terminal and a weld strap by allowing at least some relative motion between the cell and other cells coupled to the weld strap (or between the cell and a frame supporting the cell, etc.).

Figure 1A:
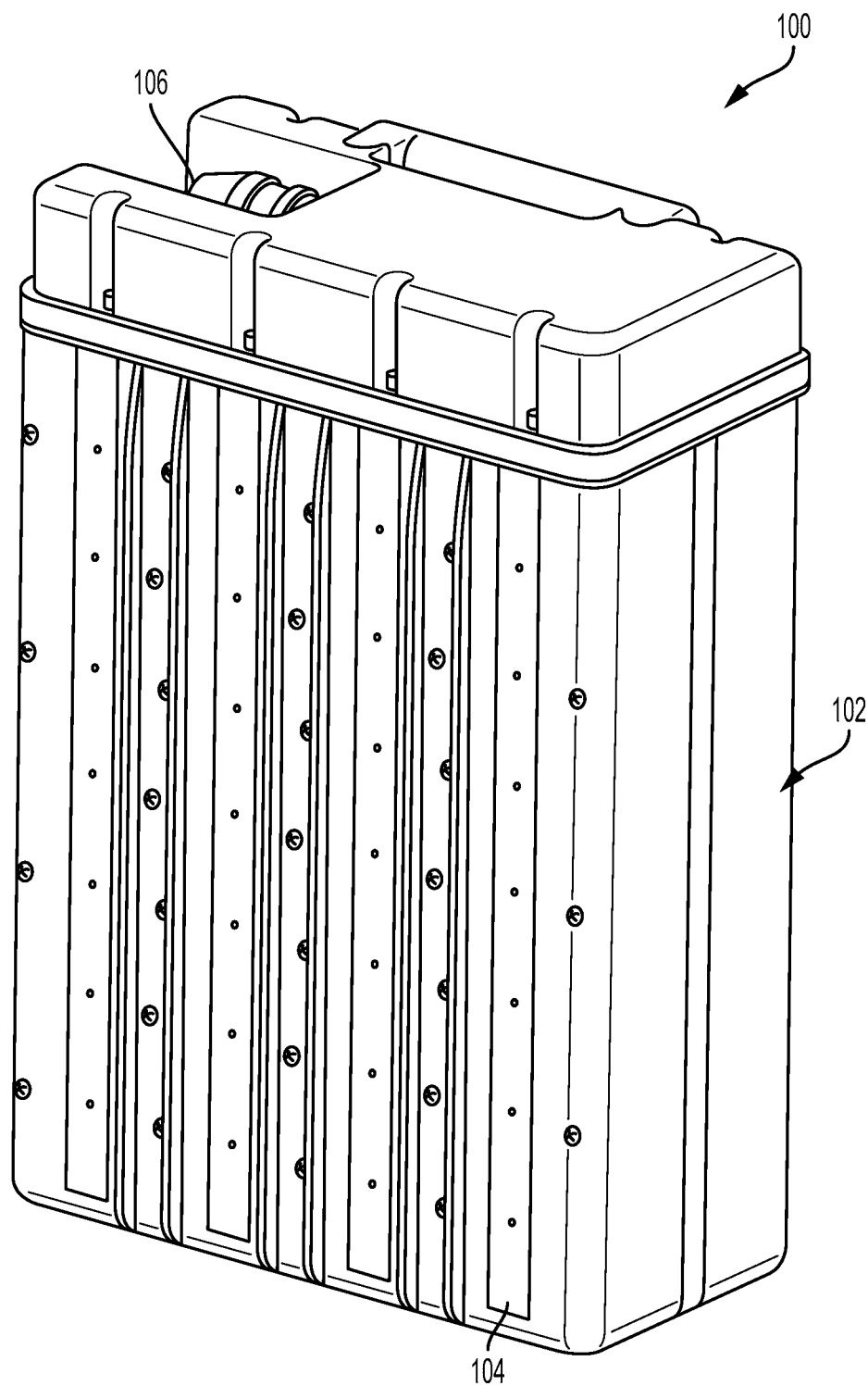
FIG. 1A illustrates a power supply device, according to an example embodiment.

Referring now to the Figures, FIG. 1A illustrates an example power supply device 100, according to an example embodiment. As shown, the device 100 includes enclosure 102, heat sink window 104, and power connector 106. However, in some implementations, the device 100 may include additional or fewer components than those shown. Power supply device 100 may provide power to various electrical systems. An electrical system may receive power from power supply device 100 via a connection to power connector 106, for example.

For example, power supply device 100 may be provided with a robotic device. In this example, the power supply device 100 may power various components of the robotic device, including one or more processors, one or more actuators, and/or other components of the robotic device. The various components may receive power via a connection to power connector 106 of the power supply device 100, for example. In other examples, power supply device 100 may be provided with other types of electrical systems.

Figure 1B:
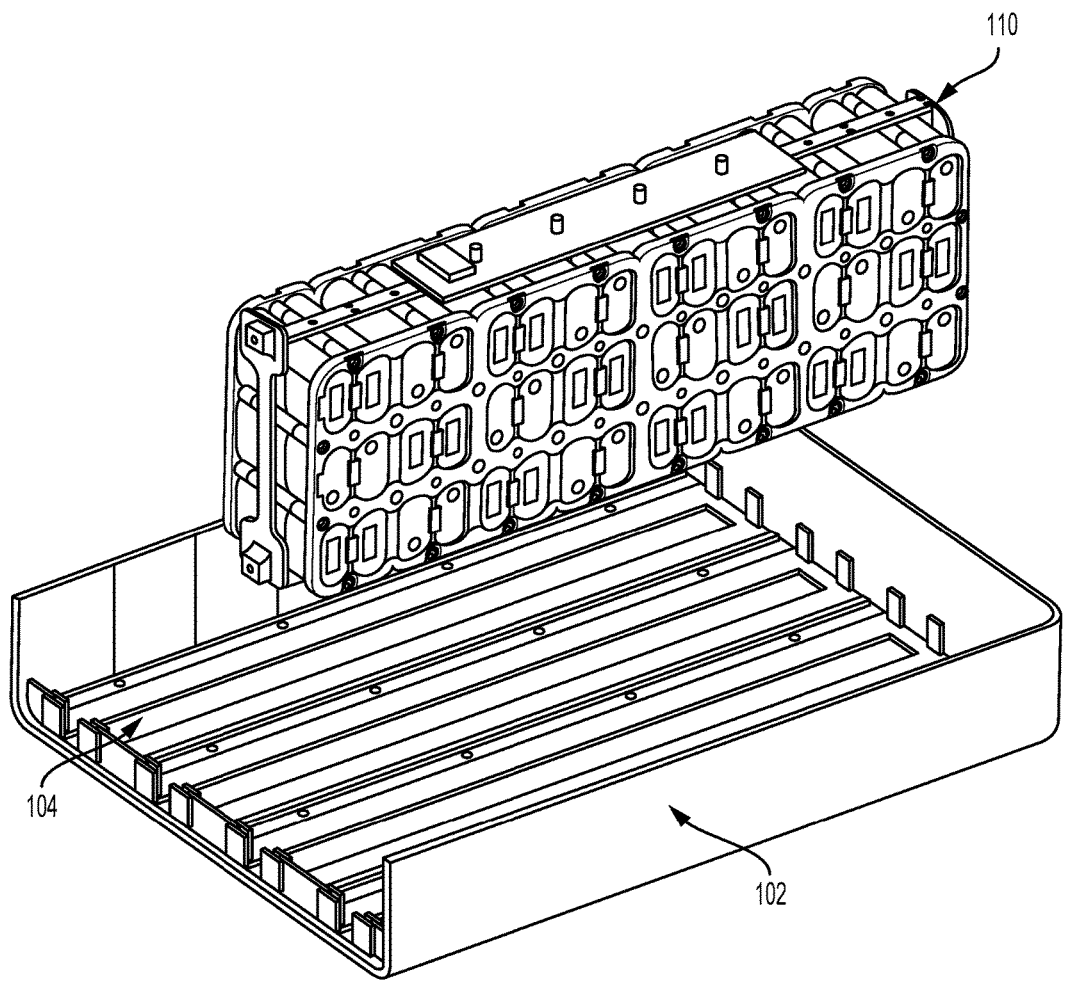
FIG. 1B illustrates an assembly of the power supply device of FIG. 1A, according to an example embodiment.

FIG. 1B illustrates a view of a portion of an interior assembly of the power supply device 100 of FIG. 1A, according to an example embodiment. FIG. 1B shows a portion of the enclosure 102, the heat sink window 104, and cell bank 110. Although FIG. 1B only shows one cell bank 110, in some implementations, the device 100 may include additional cell banks. In one implementation, up to four cell banks, exemplified by cell bank 110, can be inserted into enclosure 102. The cell bank 110 may be attached to the enclosure 102 by inserting a heat sink (not shown) of the cell bank 110 into heat sink window 104 of enclosure 102. By doing so, the heat sink may be exposed to the environment surrounding the power supply device 100, for example. The exterior surface 108 can be formed from any material, such as plastics, metals, etc., configured to protect the enclosed cell bank 110 from environmental damage, for example.

In some examples, as shown, the enclosure 102 shown in FIG. 1B can house up to four cell banks. However, in some implementations, the power supply device 100 includes more or fewer cell banks according to power requirements of a system powered by the power supply device 100, and the enclosure 102 may thus take any other form or shape according to the number of cell banks that the enclosure 102 is configured to support.

Figure 2:
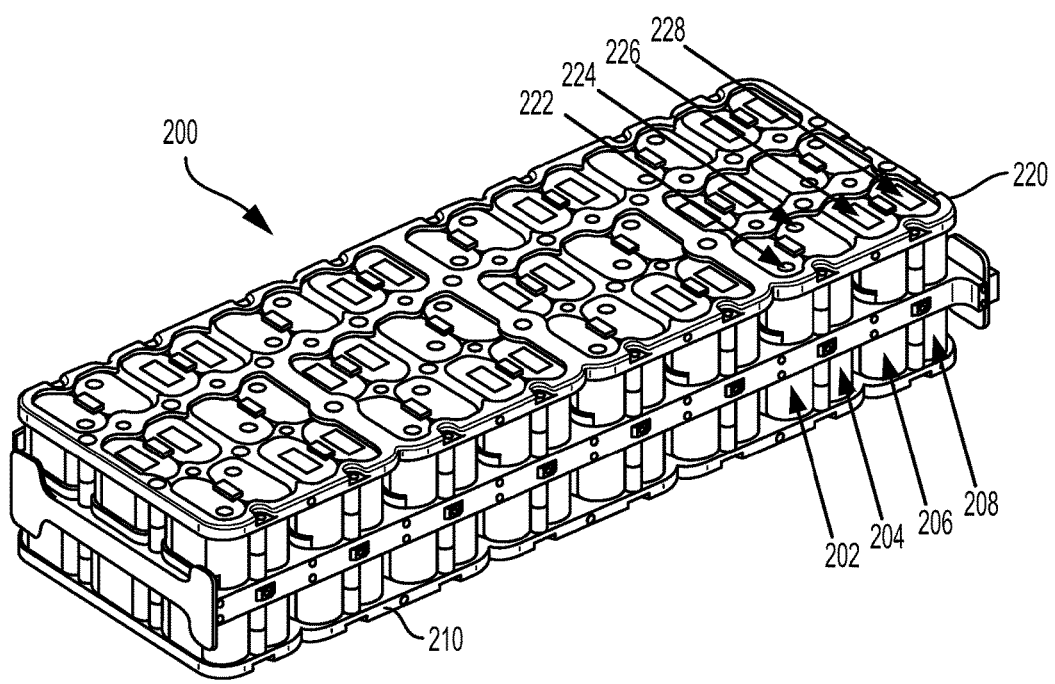
FIG. 2 illustrates an energy-storage device, according to an example embodiment.

FIG. 2 illustrates an energy-storage device 200, according to an example embodiment. In some examples, the device 200 may be similar to the cell bank 110 of the device 100. The device 200 includes a plurality of energy-storage cells, exemplified by cells 202, 204, 206, and 208, arranged according to a physical arrangement as shown in FIG. 2. For example, as shown, the device 200 may include one or more cell frames, such as cell frames 210 and 220, configured to support the cells 202, 204, 206, and 208 in the physical arrangement.

In some embodiments, the device 200 may include additional or fewer cells than those shown in FIG. 2. Further, in some embodiments, the physical arrangement of the cells 202, 204, 206, and 208 and/or any of the other energy-storage cells of the device 200 may be different than the physical arrangement shown in FIG. 2.

The cells 202, 204, 206, and 208 may include any type of energy-storage cells, such as primary cells, secondary cells (e.g., rechargeable), electrochemical cells, fuel combustion cells, capacitive energy-storage cells, supercapacitors, wet cells, dry cells, molten salt cells, hydrogen fuel cells, photovoltaic cells, or any other type of battery cell, among other possibilities. Example primary electrochemical cells include zinc-carbon cells, zinc-chloride cells, alkaline cells, nickel oxyhydroxide cells, lithium-copper oxide cells, lithium-iron disulfide cells, lithium-manganese dioxide cells, lithium-carbon fluoride cells, lithium-chromium oxide cells, mercury oxide cells, zinc-air cells, zamboni pile cells, silver-oxide cells, magnesium cells, among other possibilities. Example secondary (rechargeable) electrochemical cells include nickel-cadmium cells, lead-acid cells, nickel-metal-hydride cells, nickel-zinc cells, silver-zinc cells, lithium ion cells, among other possibilities. Other types of cells are possible as well.

To that end, in some examples, the plurality of cells of the device 200 may include a plurality of terminals that serve as electrical contacts between the plurality of cells and conductive circuitry (not shown), such as wiring, etc., to facilitate transfer of power from or to the respective cells. For example, as shown, the cells 202, 204, 206, and 208, each have, respectively, terminals 222, 224, 226, 228. It is noted that the shapes, positions, and appearance of the terminals 222-228 shown in FIG. 2 is for the sake of example only. Thus, in some embodiments, the terminals 222-228 may have different shapes, positions, appearances, etc.

The terminals 222-228, for example, may be associated with anodes (e.g., negative terminals) and/or cathodes (e.g., positive terminals) of the respective cells 202-208. For instance, if a conductive path (e.g., wire, etc.) is provided between an anode and a cathode of a given cell, an electrical current may flow through the conductive path between the anode and the cathode, thereby transferring power between the given cell and any circuitry along the conductive path. To that end, the terminals 222-228 may include any conductive material (e.g., metal, metal-oxide, etc.) suitable for conducting an electrical current from or to the respective cells 202-208. In one embodiment, the terminals 222 and 224 may be associated with anodes (e.g., negative terminals), respectively, of the cells 202 and 204, and the terminals 226 and 228 may be associated with cathodes (e.g., positive terminals), respectively, of the cells 206 and 208. However, other configurations of the terminals 222-228 are possible as well depending on the particular arrangement of the cells 202-208, or a configuration of the device 200, etc. For instance, the cells 202-208 may be alternatively arranged such that all the terminals 222-228 are anodes, or such that all the terminals 222-228 are cathodes, among other possibilities.

In some examples, the plurality of cells of the device 200 may include additional terminals other than those shown in FIG. 2. For example, the cell 202 may also have another terminal positioned along another side of the cell 202 (e.g., opposite to the side where the terminal 222 is positioned, any other side, etc.), or along the same side as the terminal 222.

Further, in some examples, as shown, the cells 202, 204, 206, and 208 each have at least one terminal arranged along a substantially planar surface defined by the cell frame 220. Thus, in some examples, a conductive sheet (not shown), such as a weld strap, may be positioned to overlap with terminals 222-228 of the cells 202-208. In these examples, two or more of the terminals 222-228 can be welded to the conductive sheet to generate a combined power output of two or more cells associated with the two or more terminals.

Figure 3:
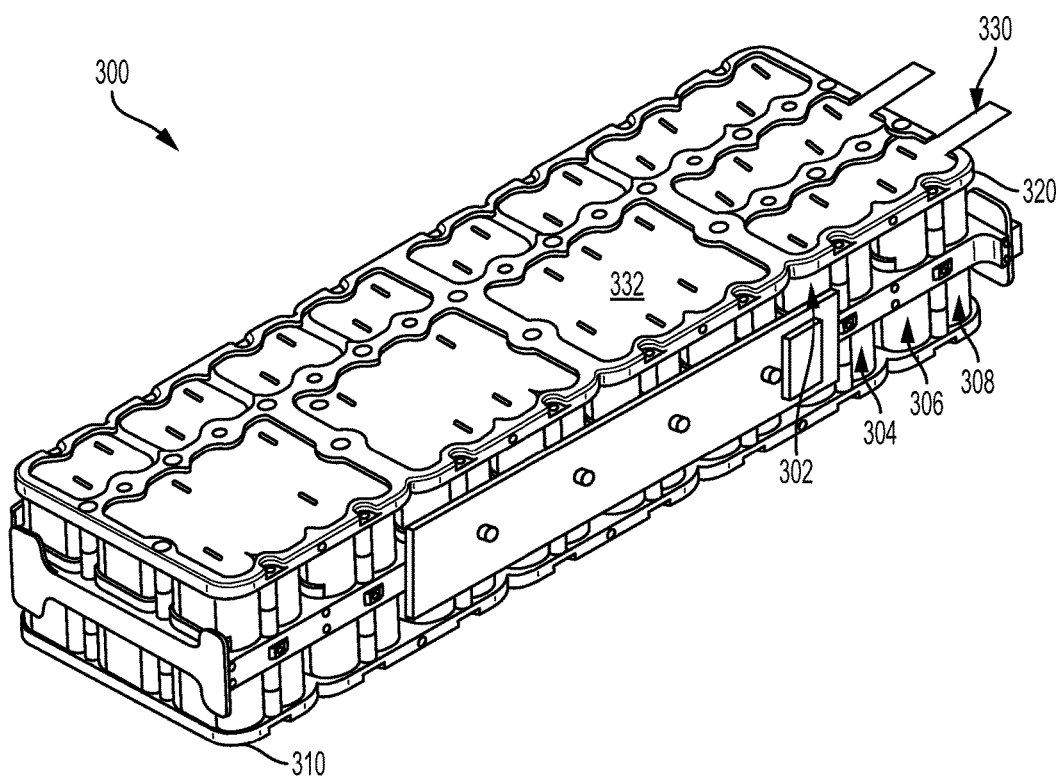
FIG. 3 illustrates another energy-storage device, according to an example embodiment.

FIG. 3 illustrates another energy-storage device 300, according to an example embodiment. The device 300 may be similar to the cell bank 110 and/or the device 200, for example. As shown, the device 300 includes a plurality of energy-storage cells, exemplified by cells 302, 304, 306, and 308, which may be similar, respectively, to the cells 202, 204, 206, and 208 of the device 200, for example. Further, as shown, the device 300 may include one or more cell frames, exemplified by cell frames 310 and 320, configured to align the plurality of cells in a physical arrangement, similarly to the cell frames 210 and 220 of the device 200. Although not shown in FIG. 3, in some embodiments, the cells 302-308 may also include a plurality of terminals similar to the terminals 222-228 of the cells 202-208 shown in FIG. 2.

To that end, as shown, the device 300 also includes a plurality of conductive sheets (e.g., weld straps, etc.), exemplified by conductive sheets 330 and 332, that are each positioned to overlap with a particular subset of the plurality of terminals (not shown) of the plurality of cells of the device 300. For example, as shown, the conductive sheet 330 may be positioned to overlap with one or more terminals (not shown) of the cells 302-308. In this example, a first side of the conductive sheet 330 may be adjacent to the one or more terminals (e.g., terminals 222-228 of the device 200, etc.), and a second side opposite to the first side may correspond to the side of the conductive sheet 330 pointing out of the page as shown in FIG. 3.

The conductive sheets 330 and 332 may include any conductive material (e.g., nickel, copper, other metal, metal oxide, etc.) configured to electrically couple one or more of the cells adjacent to the respective conductive sheets 330 and 332. For example, the conductive sheet 330 may be configured to electrically couple any combination of one or more of the cells 302-308, by welding respective terminals of one or more of the cells 302-308 to the conductive sheet 330. In this example, the conductive sheet 330 may be configured as a welding strap to combine available power generated by the one or more connected cells (or provided to the one or more connected cells).

By way of example, in a parallel circuit configuration, two positive terminals of two cells can be connected to one another (and the two negative terminals of those two cells similarly connected) to provide a combined available current to other circuit elements connected along an electrical current path between the positive terminals and the negative terminals. In this example, the combined available current corresponds to a sum of the available current from each individual cell of the two cells. As another example, in a series circuit configuration, a positive terminal of a first cell and a negative terminal of a second cell can be connected (and a positive terminal of the second cell can be connected to a negative terminal of the first cell) to provide a combined available voltage output of the combined cells to other circuit elements connected along an electrical current path in the circuit. In this example, the available voltage corresponds to a sum of the available voltages from each individual cell of the two cells. In both the series circuit configuration and the parallel circuit configuration, the available power from the combination of the two cells may correspond to a sum of the available power from each individual cell (e.g., power is the product of voltage and current).

Thus, in one implementation, where the cells 302 and 304 each have a power rating of 40 Watts, and the weld strap 330 connects cells 302 and 304 in series or in parallel, the combined available power may be 80 Watts. In another implementation, where the weld strap 332 connects eight cells into a string of cells, then the combined available power from the eight cells may be 320 Watts. Other power ratings for each cell or combination of cells are possible as well. For example, cell 302 may have a different power rating than cell 304, or a different power rating than 40 Watts.

Other configurations for welding the conductive sheets 330 and 332 (e.g., weld straps) to any combination of the plurality of cells (e.g., cells 302-308, other cells of the device 300, etc.) are possible as well. Thus, in some implementations, conductive sheet 330 (or 332) may take other forms and may overlap a different number of cells than shown in FIG. 3, and/or may be welded to some or all the cells that the conductive sheet 330 (or 332) overlaps.

In some implementations, cells 302-308 may also have additional terminals other than terminals (not shown) adjacent to the conductive sheet 330. For example, the cell 302 may have a terminal (not shown) positioned along a side of the cell 302 opposite to the side adjacent to the conductive sheet 330. Thus, in these embodiments, device 300 may also include additional conductive sheets other than those shown. For example, device 300 may include conductive sheets (not shown), similar to the conductive sheets 330 and 332, that are positioned along another side of the device 300 opposite to the side adjacent to conductive sheets 330 and 332. Thus, in this example, device 300 may allow electrically coupling various terminals (e.g., positive terminals, negative terminals, etc.) of any of the cells 302-308 that are positioned along any side of the device 300.

In some implementations, device 300 may also include electrical connections (not shown) between any combinations of the plurality of conductive sheets shown in FIG. 3. For instance, an electrical connection may be included between the conductive sheets 330 and 332 (e.g., between adjacent sides of the two conductive sheets 330 and 332, etc.) to electrically couple cells welded to the conductive sheet 330 with cells welded to the conductive sheet 332.

In some implementations, device 300 may include additional or fewer conductive sheets than those shown in FIG. 3. In one implementation, conductive sheets 330 and 332 may be alternatively implemented as a single conductive sheet that overlaps the cells adjacent to both sheets 330 and 332. In another implementation, device 300 may include only one of the conductive sheets 330 or 332 but not both. Other implementations are possible as well.

As shown, conductive sheets 330 and 332 are shaped to facilitate alignment of the respective conductive sheets 330 and 332 with terminals (not shown) of respective cells (e.g., cells 302-308, etc.) overlapped by the respective conductive sheets 330 and 332. Additionally or alternatively, in some embodiments, conductive sheets 330 and 332 may take other shapes and forms than those shown in FIG. 3. However, for the sake of example, conductive sheets 330 and 332 are shaped as shown to facilitate assembly of the device 300 according to the particular arrangement defined by the cell frames 310 and/or 320. Thus, for example, the cell frames 310 and 320 may facilitate rapid welding of conductive sheets 330 and/or 332 to any combination of adjacent respective cells (e.g., cells 302-308, etc.) by aligning the cells for welding and shaping frames 310 and 320 according to shapes of the respective conductive sheets 330 and 332. Therefore, exemplary embodiments herein may also facilitate improved assembly and manufacturing of the devices 100, 200, and 300 (or components thereof).

Figure 4A:
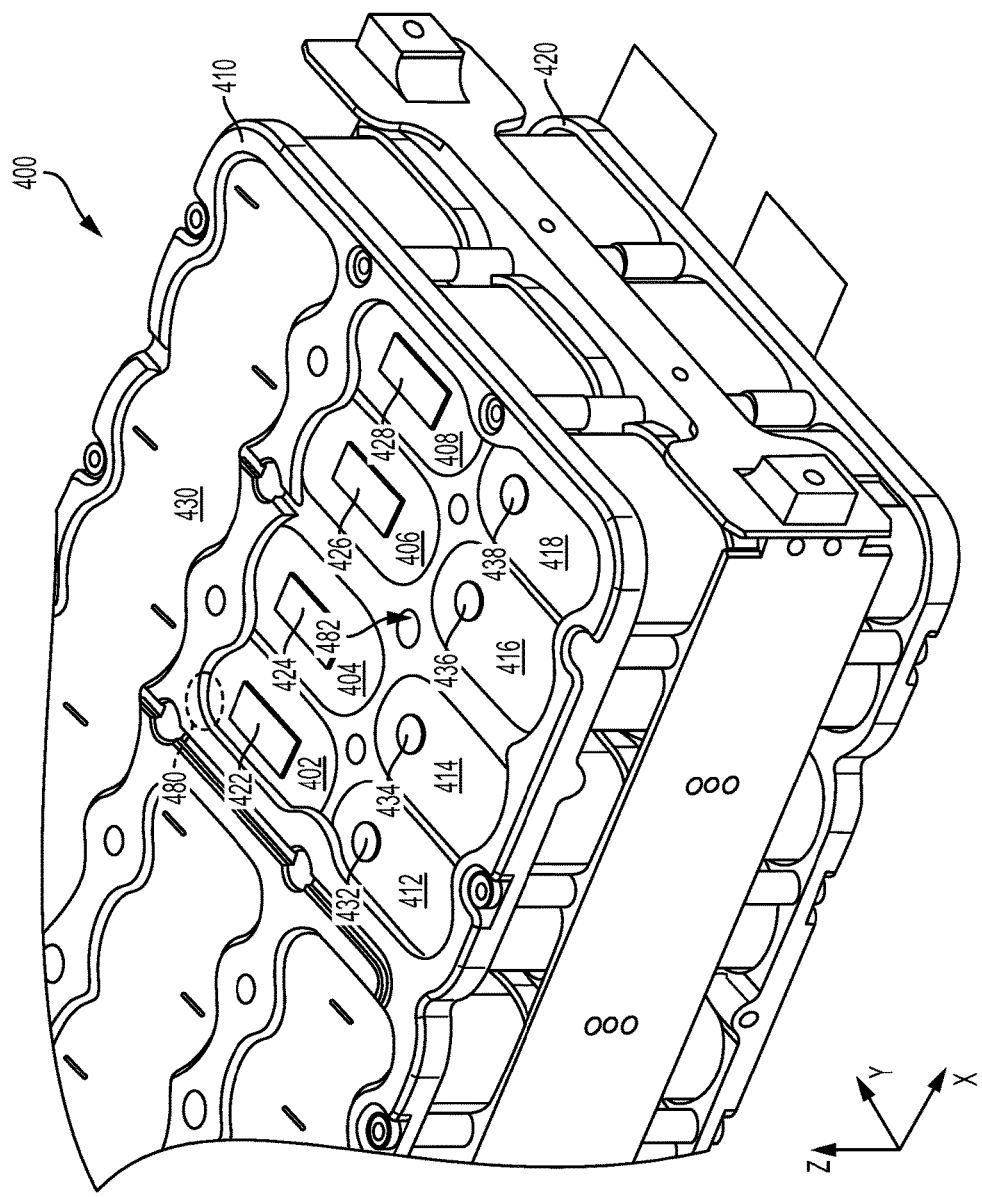
FIG. 4A illustrates a partial view of yet another energy-storage device, according to an example embodiment.

FIG. 4A is a partial view of an energy-storage device 400, according to an example embodiment. In some examples, device 400 may be similar to any of the devices 100, 200, and/or 300. For example, device 400 includes a plurality of cells, exemplified by cells 402, 404, 406, 408, 412, 414, 416, 418, that are similar to cells 302, 304, 306, 308 of device 300. Device 400 also includes frames 410 and 420 that are similar, respectively, to frames 310 and 320 of device 300. For example, as shown, frames 410 and 420 are configured to receive the plurality of cells of the device 400 in a particular physical arrangement. Device 400 also includes one or more conductive sheets (e.g., weld strap devices), exemplified by sheet 430, that are similar to any of sheets 330 and 332 of device 300. As shown, cells 402, 404, 406, 408, include, respectively, terminals 422, 424, 426, 428. Further, as shown, cells 412, 414, 416, 418, include respectively terminals 432, 434, 436, 438. The various terminals of the plurality of cells shown in the device 400 may be similar to any of the terminals 222, 224, 226, and/or 228 of the device 200.

As shown, frame 410 may include one or more alignment structures, exemplified by structures 480 and 482, configured to receive or align with a conductive sheet (not shown). Example alignment structures include any mechanical feature such as dents, ridges, marks, holes, pins, edges, or corners, among others. In one example, structures 480 and 482 are shaped in accordance with respective shapes of respective features in a conductive sheet (not shown). In this example, structures 480 and 482 can be aligned with the respective features to facilitate mounting the conductive sheet in accordance with the particular physical arrangement of the cells in the device 400. Example alignment features are described in greater detail within exemplary implementations herein.

As noted above, the plurality of cells in the device 400 may have any arrangement. However, for the sake of example, the particular physical arrangement of the cells shown in FIG. 4A may correspond to an arrangement where terminals 422, 424, 426, 428 are positive terminals of, respectively, cells 402, 404, 406, 408. Further, in this example, terminals 432, 434, 436, 438, are negative terminals of, respectively, cells 412, 414, 416, 418. Thus, in this example, if a conductive sheet (not shown) is applied such that a first side of the conductive sheet (or weld strap) is adjacent to terminals 422, 424, 426, 428, and the respective terminals are welded to the conductive sheet, then cells 402, 404, 406, 408 may be connected in a parallel circuit arrangement as a first combination of parallel cells. Further, in this example, if the conductive sheet (not shown) also couples to terminals 432, 434, 436, 438, then all eight cells 402, 404, 406, 408, 412, 414, 416, 418 may become electrically coupled to one another such that the first combination of cells is connected in series to a second combination of parallel cells (cells 412, 414, 416, 418). With this arrangement, a combined available power of all eight cells can be achieved to correspond to a sum of the available power provided by each of the cells 402, 404, 406, 408.

However, in some scenarios, welds connecting the various terminals to the conductive sheet (not shown) may become disconnected if a particular cell moves along a translational axis (e.g., axis x, y, z, a combination of any of these axes, etc.) or along a rotational axis of the particular cell, where a similar motion does not occur at other locations or contacts in the conductive sheet, for example. Additionally or alternatively, in these scenarios, forces acting on a welded terminal of a cell (e.g., due to motion of one or more of the welded cells) may cause internal damage to the cell. The internal damage may result in a short circuit (e.g., fire hazard), for instance. Accordingly, example implementations herein improve operational safety of energy-storage devices by accommodating relative motion between the cells. Such motion may be caused, for instance, by external forces or any other force acting on the device 400 or a component thereof in line with the discussion above. Although frames 410 and 420 support the plurality of cells in the particular physical arrangement shown, in these scenarios, one or more of the cells or a system (e.g., robotic device, etc.) that includes the device 400 may experience forces that may still cause such motion.

Accordingly, the present disclosure provides implementations that involve a conductive sheet (or weld strap) configured to allow relative motion between one or more of the plurality of cells 402, 404, 406, 408, 412, 414, 416, 418, and/or relative motion between a cell and a frame (e.g., frame 410), while reducing potential forces from acting on contacts welded to one or more of the cells as a result of the relative motion.

Figure 4B:
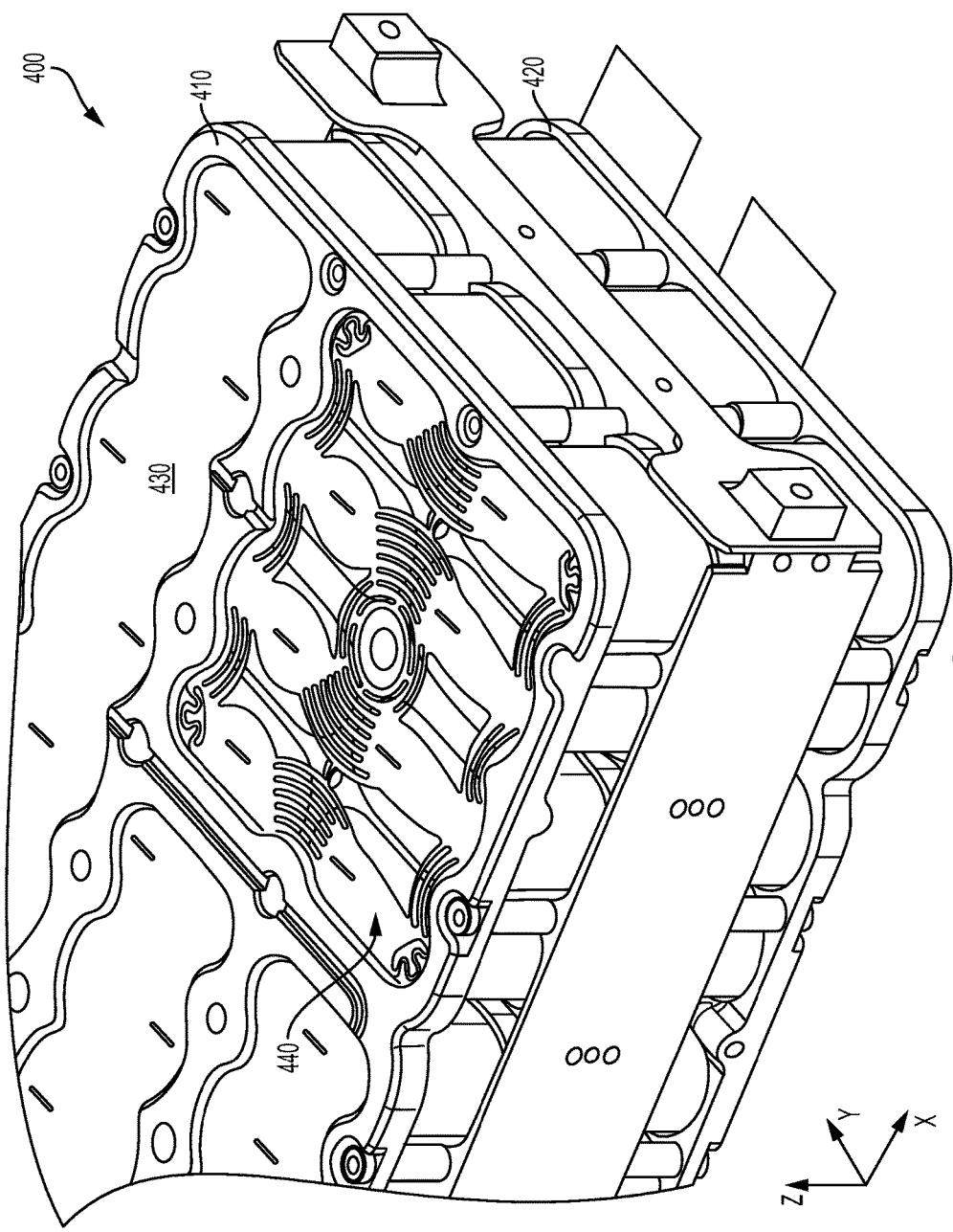
FIG. 4B illustrates the device of FIG. 4A including a conductive sheet having a flexure, according to an example embodiment.
Figure 4C:
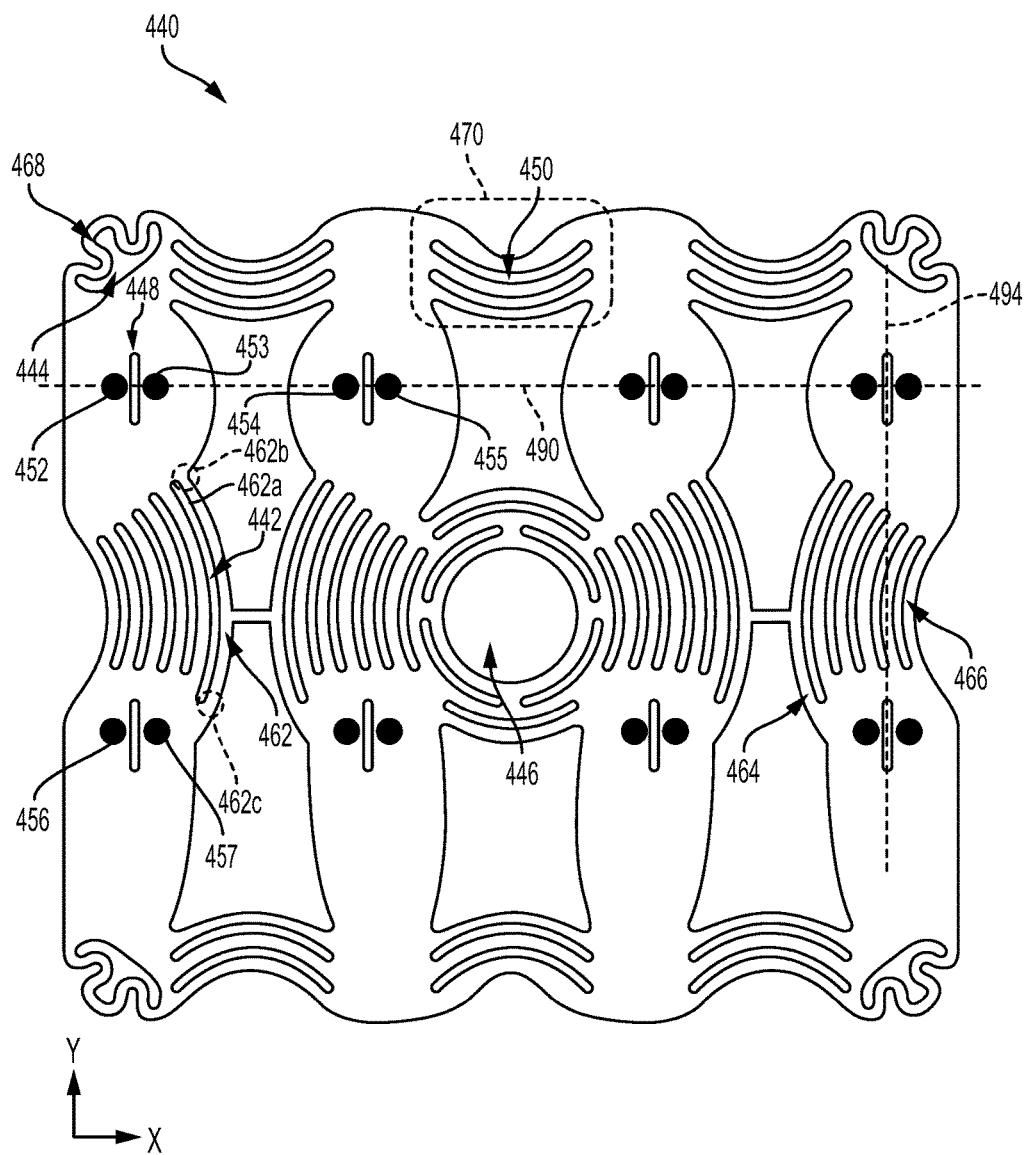
FIG. 4C is an illustration of the conductive sheet of FIG. 4B, according to an example embodiment.

For example, FIG. 4B illustrates a conductive sheet 440 (e.g., "weld strap") positioned adjacent to the plurality of cells 402, 404, 406, 408, 412, 414, 416, 418 of the device 400, according to an example embodiment. FIG. 4C illustrates a top view of the conductive sheet 440 (e.g., "weld strap device") of FIG. 4B, according to an example embodiment. The side of conductive sheet 440 pointing out of the page in FIG. 4C corresponds to the side of conductive sheet 440 pointing out of the page in FIG. 4B.

Conductive sheet 440 includes a plurality of gaps, exemplified by gaps 442, 444, 446, 448, and 450. However, in some examples, weld strap 440 may include more or fewer gaps than those shown. The plurality of gaps may extend between a first side of conductive sheet 440 and a second side of conductive sheet 440 opposite to the first side. For example, the first side may be configured to be positioned adjacent to respective terminals of cells 402, 404, 406, 408, 412, 414, 416, 418, and the second side may be the side pointing out of the page in FIGS. 4B and 4C. Thus, as shown in FIG. 4B, cells 402, 404, 406, 408, 412, 414, 416, 418 may be viewable through the plurality of gaps when the conductive sheet 440 is positioned to overlap with the cells, for example.

Conductive sheet 440 also includes a plurality of contacts, exemplified by contacts 452, 453, 454, 455, and 456. However, in some examples, weld strap 440 may include more or fewer contacts than those shown. In some implementations, a contact includes a portion of the conductive sheet 440 that is positioned to overlap with a terminal of a cell when the conductive sheet 440 is aligned with the plurality of cells. Referring back to FIGS. 4A and 4B by way of example, contacts 452 and 453 shown in FIG. 4C may be configured to overlap with terminal 422 of cell 402 when weld strap 440 is mounted to device 400. Similarly, for example, contacts 454 and 455 may be configured to overlap with terminal 424 of cell 404, and contacts 456 and 457 may be configured to overlap with terminal 432 of cell 412. During assembly, various welding processes are possible for coupling the contacts with respective terminals adjacent to the contacts, such as spot-welding, or soldering, among others.

In one implementation, a parallel electrode spot-welding apparatus (not shown) can be utilized by positioning a first electrode of the apparatus at the position of contact 452 overlapping terminal 422 and a second electrode of the apparatus at the position of contact 453 also overlapping terminal 422. In this example, the spot-welding apparatus may then apply a current to weld the conductive sheet 440 to the terminal 422. Since gap 448 separates contacts 452 and 453, the length of an electrical current path around gap 448 between the first electrode and the second electrode is increased, and thus the resistance of such path is also increased. As a result, for instance, a sufficient portion of the applied current may flow from the first electrode to the second electrode via the terminal 422. Further, the applied current may then cause the conductive material of contacts 452 and 453 to melt and/or fuse with the terminal 422. Other implementations are possible as well. Similarly, contacts 454, 455, 456, and 457 can be welded to respective terminals adjacent to the contacts. Although FIG. 4C shows two contacts overlapping each terminal, in some implementations, each terminal may be coupled to more or fewer than two contacts. For example, laser beam welding may involve applying a laser beam to the conductive sheet to form one or more contacts coupled to each terminal. Thus, in some examples, device 400 can be implemented without gap 448, and contacts 452 or 453 can be welded to without the separation gap 448. Other examples are possible as well.

In some implementations, one or more of the plurality of gaps are shaped to define one or more flexures in the conductive sheet 440. In these implementations, a flexure may correspond to a portion of the conductive sheet 440 having a curved edge adjacent to a gap. For example, flexure 462 corresponds to a portion of weld strap 440 having curved edge 462a adjacent to gap 442. In one implementation, as shown, curved edge 462a is arranged to be substantially coplanar with contacts 452, 453, 456, 457 (e.g., substantially parallel to a geometric plane that includes the contacts). In other implementations (not shown), a curvature of flexure 462 may be configured along a different plane (e.g., curved edge 462a can be configured as a raised/dented edge of sheet 440, etc.) than the plane that includes the contacts 452, 453, 456, 457.

In some implementations, one or more flexures in the weld strap 440 are arranged to extend between a first end overlapping a first cell and a second end overlapping a second cell. For example, as shown, the curvature of curved edge 462a extends from a first end 462b of flexure 462 to a second end 462c of flexure 462. Although the curvature of curved edge 462a is shown to have an arc shape, in some implementations, curved edge 462a can alternatively have any other curved shape (e.g., wave shape, S-shape, etc.) according to a shape of gap 442 adjacent to flexure 462. Further, referring back to FIGS. 4A and 4B, the first end 462b overlaps with cell 402 and the second end 462c overlaps cell 412. With this arrangement, for example, flexure 462 may allow weld strap 440 to accommodate relative motion between cells 402 and 412.

Referring back to FIGS. 4A and 4B by way of example, consider a scenario where cell 402 moves along any of the x, y, and/or z axes or rotates about any of these axes due to a sudden force acting on a system that includes device 400. In the scenario, if contacts 452 and 453 are welded to terminal 422 of cell 402, then contacts 422 and 453 may also move according to the motion of the cell 402. In this scenario, flexure 462 may then flexibly bend (e.g., stretch or compress) by way of a change in the curvature of curved edge 462a. In turn, contacts 456 and 457 can remain positioned at respective positions shown in FIG. 4C, within a threshold distance from the respective positions, or within a threshold orientation from respective orientations of the contacts 456 prior to the motion of contacts 452, 453. Various threshold values are possible (e.g., 0.1 cm, 0.1°, etc.). Additionally, in some examples, the threshold values can be predetermined depending on an application of the device 400 (e.g., expected shocks, etc.). Thus, in some implementations, the curvature of the curved edge 462a changes in response to relative motion between two or more contacts (e.g., contacts 452 and 456) welded to respective battery cells. In these implementations, flexure 462 flexibly bends to provide a more flexible connection between the two or more contacts. Thus, these implementations may reduce the magnitude of forces between the contacts and the respective cells welded to the contacts, thereby reducing the likelihood of damage to the contacts or to the battery cells welded to the contacts.

Through this process, for example, the likelihood of damage to the welds of contacts 452, 453, 456, 457 is reduced based on at least some of the force or energy associated with the motion of cell 402 is absorbed by one or more flexures (e.g. flexure 462) instead of being absorbed by the welds between the respective contacts and the respective terminals.

Figure 4D:
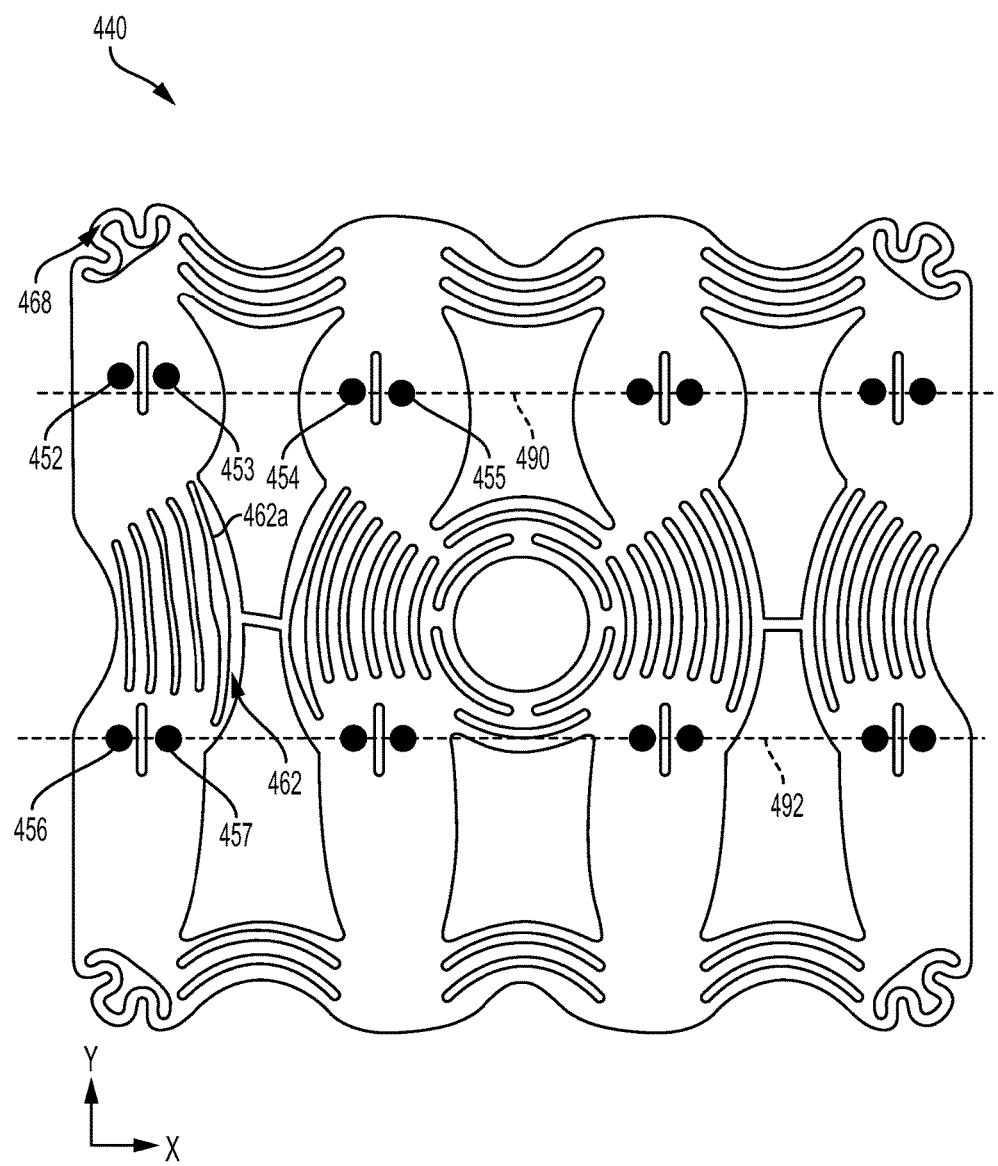
FIG. 4D is a conceptual illustration of an operation of the device 400, according to an example embodiment.

FIG. 4D is a conceptual illustration of this scenario. In the scenario of FIG. 4D, contacts 452, 453, 454, 455 are initially arranged along axis 490 in accordance with the physical arrangement of cells 402, 404, 406, 408. Similarly, in this scenario, contacts 456 and 457 are initially arranged along axis 492. In the scenario, contacts 452 and 453 move according to a translational path along the y-axis of FIG. 4D. Next, in the scenario, one or more flexures of the weld strap 440 flexibly bend (e.g., stretch or compress) to change the respective curvatures of the flexures. For instance, as shown, flexure 462 stretches to reduce the curvature of curved edge 462a, and as a result, contacts 456 and 457 can remain at substantially the same positions along axis 492 (or within a threshold distance/orientation to the initial positions) even after the motion of the contacts 452 and 453 away from the contacts 456 and 457. The threshold may include any tolerance value (e.g., 0.1 cm, 1 cm, 0.1° of rotation, etc.) in accordance with various applications of the device 400.

Other scenarios are possible as well. For example, if the motion of the contacts 452, 453 was alternatively a rotational motion and/or a translational motion along a different axis, then the curvature of flexure 462 and/or any other flexure can responsively change to accommodate the motion and to absorb at least part of the force caused by the motion to mitigate the effect of the force on contacts 456, 457.

In some implementations, the weld strap 440 includes a plurality of flexures having respective curved edges extending from first respective ends configured to overlap a first cell to second respective ends configured to overlap a second cell. For example, as shown in FIG. 4C, a plurality of flexures 470 has respective curved edges extending between first respective ends configured to overlap cell 404 of FIG. 4A and second respective ends configured to overlap cell 406 of FIG. 4A. For example, the plurality of flexures 470 may correspond to a portion of the conductive sheet 440 adjacent to the plurality of flexures. Further, in these implementations, two or more of the plurality of flexures 470 may be positioned adjacent to the same gap (e.g., gap 450). With this arrangement for example, additional flexibility between the cells 404 and 406 can be achieved based on each of the flexures 470 flexibly bending to have a respective curvature depending on the relative motion between the cells 404 and 406. Additionally, in some implementations, as shown in FIG. 4C, the plurality of flexures 470 may have parallel curvatures based on at least the plurality of cells being arranged in the particular physical arrangement (e.g., when the contacts are arranged along axes 490 and 492 of FIG. 4D).

In some implementations, the number of flexures and/or the volume of conductive material positioned between two cells (e.g., resistance of conductive path) is based on an expected current along the conductive path between the two cells. Referring back to FIG. 4A by way of example, during operation of the device 400, an expected electrical current between positive terminal 422 and negative terminal 432 may be greater than an expected current between positive terminal 422 and positive terminal 424 due to the respective expected voltage differences between the respective terminals. Thus, as shown in FIG. 4B, the conductive sheet may include a greater volume of conductive material (e.g., six flexures) along the conductive path between terminals 422 and 432 than a volume of conductive material (e.g., three flexures) along the conductive path between terminals 422 and 424.

In some implementations, where a plurality of flexures are positioned between two cells, a first flexure of the plurality may be positioned at a first direction from a linear axis that overlaps a first terminal of a first cell, and a second flexure of the plurality may be positioned at a second direction from the linear axis. For example, in FIG. 4C, linear axis 494 is configured to overlap terminals 428 and 438 when weld strap 440 is mounted to the device 400. Further, as shown, flexure 464 is at a negative direction from axis 494 along the x-axis, and flexure 466 is at a positive direction from axis 494 along the x-axis. With this arrangement, for example, weld strap 440 may accommodate a rotational relative motion between cells 408 and 418 (e.g., about a respective z-axis of a cell) based on stretching of one of the flexures and compressing the other flexure. Alternatively, in other implementations, all the plurality of flexures in a portion of the conductive sheet between two cells may be included at a same direction from the linear axis. For example, in FIG. 4C, all of the plurality of flexures 470 are positioned at a same direction from axis 490 that extends through contacts 452, 453, 454, 455.

In some implementations, weld strap 440 includes a corner flexure positioned at a corner of the conductive sheet. In FIG. 4C, for example, corner flexure 468 corresponds to a portion of conductive sheet 440 having a curved edge adjacent to gap 444. In some examples, corner flexure 468 may be shaped in accordance with a shape of an alignment structure in the frame 410. Referring back to FIG. 4A by way of example, structure 480 may have a shape that corresponds to corner flexure 468 such that, during assembly, the weld strap 440 is aligned with the frame 410 based on at least an alignment of the corner flexure with the structure 480 to facilitate welding the contacts of the weld strap 440 in accordance with the particular physical arrangement of the underlying cells. For instance, structure 480 may include a dent shaped to receive an edge of corner flexure 468. Other examples are possible as well. In some implementations, corner flexure 468 may be configured to flexibly bend similarly to flexure 462 to accommodate motion of a cell relative to a frame of the device 400, while maintaining a given position of another cell relative to the frame (or within a threshold distance/orientation from the given position) in response to the motion. In FIG. 4D, for example, corner flexure 468 flexibly compresses in response to the motion of contacts 452 and 453 relative to the frame 410 shown of FIGS. 4A and 4B. Thus, in line with the discussion above, contacts 456 and 457 may remain along axis 492 based also on the change of the curvature of corner flexure 468.

In some implementations, weld strap 440 includes an alignment feature configured to align with an alignment structure of frame 410. In FIG. 4C, for example, the alignment feature may include gap 446 that is shaped to align with structure 482 of FIG. 4A. For instance, structure 480 may include a ridge that fits into the gap 446 to align conductive sheet 440 with the plurality of cells 402, 404, 406, 408, 412, 414, 416, 418 in accordance with the particular physical arrangement of the cells. In other implementations, the alignment feature may include a different type of structure in the conductive sheet 440. By way of example, instead of the gap 446, conductive sheet 440 may alternatively include a dent or a ridge (e.g., stamped region of sheet 440, etc.) that corresponds to a raised/dented portion of the conductive sheet positioned and shaped similarly to a position or shape of gap 446. In this example, alignment structure 480 of FIG. 4A may include a ridge or a dent shaped in accordance with the alignment feature and configured to receive the alignment feature. Other examples are possible as well.

Figure 5:
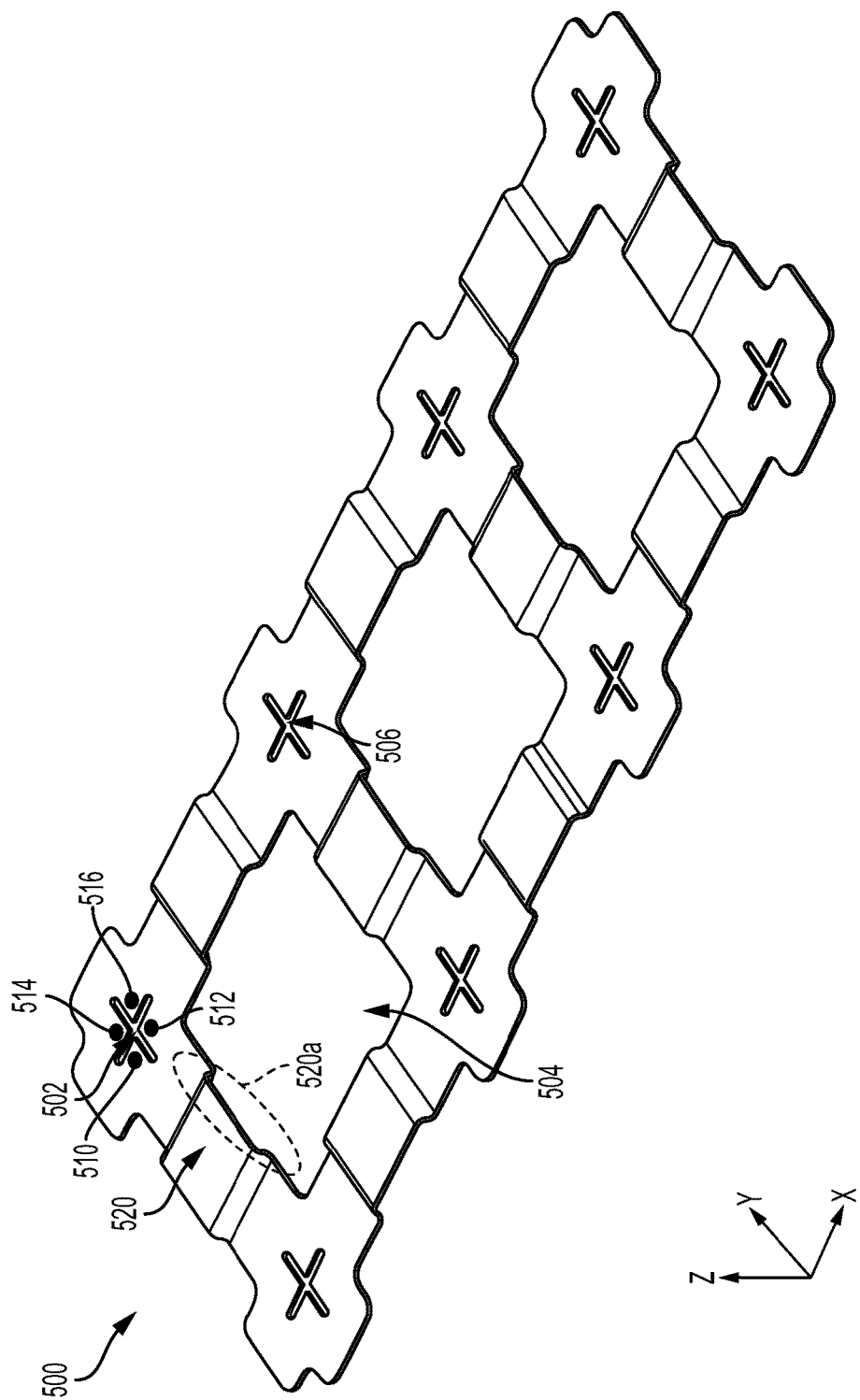
FIG. 5 is an illustration of another conductive sheet, according to an example embodiment.

FIG. 5 is an illustration of another conductive sheet 500, according to an example embodiment. Similarly to conductive sheet 440, device 500 is an example weld strap implementation that can be used with a power supply or energy-storage device such as any of the devices 100, 110, 200, 300, or 400, for example. Conductive sheet 500 may be formed from any conductive material (e.g., nickel, etc.) similarly to conductive sheet 440. Similarly to sheet 440, sheet 500 has a plurality of gaps, exemplified by gaps 502, 504, and 506. Sheet 500 also includes a plurality of contacts 510, 512, 514, 516, and a plurality of flexures exemplified by flexure 520.

In some implementations, contacts 510, 512, 514, 516 are configured similarly to contacts 452 and 453. For example, contacts 510, 512, 514, 516 may be positioned to overlap a terminal of an energy-storage cell (not shown) when the weld strap 500 is mounted to a cell bank device such as device 400. As noted above, the number of contacts welded to a terminal may vary. For instance, in sheet 500, four contacts (e.g., 510, 512, 514, 516) may be welded to one terminal. Whereas, in sheet 440 for instance, two contacts (e.g., 452, 453) may be welded to one terminal. Alternatively, in some examples, more or fewer contacts may be welded to a terminal.

In some implementations, gaps 502, 506 are configured similarly to gap 448 of sheet 440. As shown, for example, gap 502 is positioned to separate contacts 510, 512, 514, and 516. Unlike gap 448 however, gaps 502, 506 are shown to have a "+" shape. Thus, as noted above, the gaps separating contacts welded to a particular terminal may have various shapes.

Gap 508 and other similar gaps may be similar to gap 442 of FIG. 4C. For example, as shown, gap 508 is positioned adjacent to flexure 520 to define a curved edge 520a of flexure 520. Further, curved edge 520a may extend from a first end (e.g., similar to end 462b of flexure 462) to a second end (e.g., similar to end 462c of flexure 462). As shown, for instance, the first end of curved edge 520a may overlap with a first cell (not shown) welded to contacts 510, 512, 514, 516, and the second end of curved edge 520a may be configured to overlap with a second cell (not shown) adjacent to the first cell along the Y direction. However, unlike flexure 462, a curvature of the curved edge 520a of flexure 520 is not necessarily coplanar with contacts 510, 512, 514, 516. Thus, as noted above, example implementations herein may involve flexures that have a curvature that is not parallel to (i.e., intersects with) a geometric plane that includes two or more contacts, additionally or alternatively to flexures that are parallel to the geometric plane (e.g., flexure 462, etc.). In some examples, flexure 520 may be implemented as a dent or raised edge in the conductive sheet 500. Various mechanical processes are possible for forming flexure 520, such as hydro-forming, stamping, or bending, among others.

Further, as shown, the curvature of curved-edge 520a does not have an arc shape similar to the arc shape of curved edge 462a. Thus, as noted above, example implementations herein may involve curved edges having any curved shape. In one implementation, as shown, curved edge 520a can flexibly bend in response to a relative motion between cells to accommodate translational motion of a cell along any combination of the x, y, and/or z directions. Additionally, in some examples, the curvature of curved edge 520a may accommodate rotational motions of a contact about any combination of the x, y, and/or z-axes.

The arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, some of the elements described are functional entities that may be implemented as discrete or distributed components or in conjunction with other components, in any suitable combination and location, or structural elements described as independent structures may be combined.

While various aspects and embodiments have been disclosed, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
    a plurality of energy-storage cells including a first cell and a second cell; and
    a conductive sheet that has a gap extending between a first side of the conductive sheet and a second side of the conductive sheet opposite to the first side, wherein the first side is positioned adjacent to a first terminal of the first cell and a second terminal of the second cell, the conductive sheet comprising:
        a first contact positioned to overlap the first terminal and to electrically couple the first terminal with the conductive sheet, wherein the first contact comprises a portion of the conductive sheet welded to the first terminal;
        a second contact positioned to overlap the second terminal and to electrically couple the second terminal with the conductive sheet, wherein the second contact comprises a portion of the conductive sheet welded to the second terminal; and
        a flexure that includes a portion of the conductive sheet adjacent to the gap, the flexure having a curved edge adjacent to the gap, the curved edge extending from a first end positioned to overlap with the first cell to a second end positioned to overlap with the second cell, wherein a curvature of the curved edge flexibly changes in response to a motion of the first contact relative to the second contact.

2. The device of claim 1, wherein the conductive sheet comprises a plurality of flexures including the flexure, wherein at least two of the plurality of flexures are adjacent to the gap.

3. The device of claim 2, wherein particular curved edges of the plurality of flexures have parallel curvatures based on at least the plurality of cells being in a particular physical arrangement.

4. The device of claim 2, wherein the conductive sheet has a plurality of gaps including the gap associated with the flexure, and wherein the plurality of flexures correspond to a portion of the conductive sheet adjacent to one or more of the plurality of gaps.

5. The device of claim 2, wherein the plurality of flexures are positioned at a given direction from a linear axis that overlaps the first terminal and the second terminal.

6. The device of claim 1, further comprising a frame to receive the plurality of cells in a particular physical arrangement.

7. The device of claim 6, wherein the conductive sheet includes an alignment feature, wherein the frame includes a structure shaped in accordance with a shape of the alignment feature, and wherein the conductive sheet is aligned with the plurality of cells based on at least an alignment of the alignment feature with the structure.

8. The device of claim 1, wherein the flexure is positioned such that the curvature of the curved edge is parallel to a geometric plane that includes the first contact and the second contact.

9. The device of claim 1, wherein the flexure is positioned such that the curvature of the curved edge intersects with a geometric plane that includes the first contact and the second contact.

10. A device comprising:
    a plurality of energy-storage cells including a first cell and a second cell; and
    a conductive sheet that has a gap extending between a first side of the conductive sheet and a second side of the conductive sheet opposite to the first side, wherein the first side is positioned adjacent to a first terminal of the first cell and a second terminal of the second cell, the conductive sheet comprising:
        a first contact positioned to overlap the first terminal and to electrically couple the first terminal with the conductive sheet;
        a second contact positioned to overlap the second terminal and to electrically couple the second terminal with the conductive sheet; and
        a plurality of flexures, at least two of the plurality of flexures are adjacent to the gap, at least one flexure includes a portion of the conductive sheet adjacent to the gap, the at least one flexure having a curved edge adjacent to the gap, the curved edge extending from a first end positioned to overlap with the first cell to a second end positioned to overlap with the second cell, wherein a curvature of the curved edge flexibly changes in response to a motion of the first contact relative to the second contact, wherein a first flexure of the plurality of flexures is positioned at a first direction from a linear axis that overlaps the first terminal and the second terminal, and wherein a second flexure of the plurality of flexures is positioned at a second direction from the linear axis opposite to the first direction.

11. A device comprising:

a plurality of energy-storage cells including a first cell and a second cell;

a frame to receive the plurality of cells in a particular physical arrangement; and a conductive sheet that has a gap extending between a first side of the conductive sheet and a second side of the conductive sheet opposite to the first side, wherein the first side is positioned adjacent to a first terminal of the first cell and a second terminal of the second cell, the conductive sheet comprising:

a first contact positioned to overlap the first terminal and to electrically couple the first terminal with the conductive sheet;

a second contact positioned to overlap the second terminal and to electrically couple the second terminal with the conductive sheet;

a flexure that includes a portion of the conductive sheet adjacent to the gap, the flexure having a curved edge adjacent to the gap, the curved edge extending from a first end positioned to overlap with the first cell to a second end positioned to overlap with the second cell, wherein a curvature of the curved edge flexibly changes in response to a motion of the first contact relative to the second contact; and a corner flexure positioned at a corner of the conductive sheet, wherein the frame includes a structure shaped in accordance with a shape of the corner flexure, and wherein the conductive sheet is aligned with the plurality of cells based on at least an alignment of the corner flexure with the structure.

12. The device of claim 11, wherein the conductive sheet has another gap extending between the first side and the second side of the conductive sheet, and wherein the corner flexure includes a portion of the conductive sheet adjacent to the other gap.

13. The device of claim 11, wherein a curvature of the corner flexure flexibly changes in response to a motion of the first contact relative to the frame.

14. A weld strap device having a gap extending between a first side of the device and a second side of the device opposite to the first side, wherein the first side is configured to overlap a first energy-storage cell and a second energy-storage cell, the device comprising:

a first contact to overlap with the first cell and to electrically couple the first cell with the device, wherein the first contact comprises a portion of the device welded to a first terminal of the first cell;

a second contact to overlap with the second cell and to electrically couple the second cell with the device, wherein the second contact comprises a portion of the device welded to a second terminal of the second cell; and a flexure having a curved edge between the gap and the flexure, the curved edge extending from a first end positioned to overlap with the first cell to a second end positioned to overlap with the second cell, wherein a curvature of the curved edge flexibly changes in response to a motion of the first contact relative to the second contact.

15. The device of claim 14, wherein the flexure has an arc shape.

16. A device comprising:

a plurality of energy-storage cells including a first cell and a second cell;

a frame to receive the plurality of cells in a particular physical arrangement; and a conductive sheet having a plurality of gaps extending from a first side of the conductive sheet to a second side of the conductive sheet opposite to the first side, wherein the first side is to be positioned adjacent to the first cell and the second cell, the conductive sheet comprising:

a first contact positioned in accordance with the particular physical arrangement to overlap with the first cell and to electrically couple the first cell with the conductive sheet, a second contact positioned in accordance with the particular physical arrangement to overlap with the second cell and to electrically couple the second cell with the conductive sheet, and a plurality of flexures that correspond to a portion of the conductive sheet adjacent to at least one gap of the plurality of gaps, the plurality of flexures having respective curved edges separating the plurality of flexures from the at least one gap, the respective curved edges extending from first respective ends positioned to overlap with the first cell to second respective ends positioned to overlap with the second cell, wherein curvature of at least one of the respective curved edges flexibly changes in response to a motion of the first contact relative to the second contact, wherein a first flexure of the plurality of flexures is positioned at a first direction from a linear axis that overlaps a first terminal of the first cell and a second terminal of the second cell, and wherein a second flexure of the plurality of flexures is positioned at a second direction from the linear axis opposite to the first direction.

17. The device of claim 16, wherein the frame includes a structure shaped in accordance with a shape of a given gap of the plurality of gaps, and wherein the conductive sheet is aligned with the plurality of cells based on at least an alignment of the given gap with the structure.

* * * * *